US006996219B2

(12) United States Patent
Rodriguez et al.

(10) Patent No.: US 6,996,219 B2
(45) Date of Patent: Feb. 7, 2006

(54) SYSTEM AND METHOD FOR SENDING CALLED PARTY CALLER IDENTIFICATION INFORMATION TO A FORWARD-TO TELEPHONE DEVICE IN A COMMUNICATIONS SYSTEM

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 10/758,860

(22) Filed: Jan. 16, 2004

(65) Prior Publication Data

US 2005/0157859 A1 Jul. 21, 2005

(51) Int. Cl.
*H04M 1/56* (2006.01)
*H04M 15/06* (2006.01)
(52) U.S. Cl. ............................ 379/142.01; 379/88.21; 379/142.12
(58) Field of Classification Search .. 379/88.19–88.21, 379/142.01–142.03, 142.08, 211.02, 212.01, 379/93.23
See application file for complete search history.

(56) References Cited

U.S. PATENT DOCUMENTS

| 5,008,930 | A | * | 4/1991 | Gawrys et al. | 379/265.11 |
| 5,799,061 | A | * | 8/1998 | Melcher et al. | 379/45 |
| 5,875,240 | A | * | 2/1999 | Silverman | 379/142.07 |
| 6,292,549 | B1 | * | 9/2001 | Lung et al. | 379/142.01 |
| 6,442,262 | B1 | * | 8/2002 | Moss et al. | 379/142.02 |
| 6,449,351 | B1 | * | 9/2002 | Moss et al. | 379/142.09 |
| 6,522,743 | B1 | * | 2/2003 | Hurd | 379/266.04 |
| 6,826,271 | B1 | * | 11/2004 | Kanabar et al. | 379/212.01 |

* cited by examiner

*Primary Examiner*—Duc Nguyen
(74) *Attorney, Agent, or Firm*—Duke W. Yee; Jeffrey S. LaBaw; James O. Skarsten

(57) ABSTRACT

A method, computer program product, and a signaling system for conveying caller identification information of a called party to a forward-to telephone device in a communications system. A call set up message is received at a switching system servicing a called telephone device. The call set up message is determined to be forwarded to a switching system servicing a forward-to telephone device. Caller identification information of the called telephone device is inserted into a caller identification field of the call set up message.

21 Claims, 3 Drawing Sheets

SYSTEM AND METHOD FOR SENDING CALLED PARTY CALLER IDENTIFICATION INFORMATION TO A FORWARD-TO TELEPHONE DEVICE IN A COMMUNICATIONS SYSTEM

BACKGROUND OF THE INVENTION

1. Technical Field

The present invention relates generally to an improved communications system and in particular to a method and apparatus for improved call forwarding in a telecommunication system. Still more particularly, the present invention relates to a method, apparatus, and computer instructions for providing caller identification information of a called number to a forward-to telephone device terminating a call.

2. Description of Related Art

A well known signaling service available in many telecommunication systems is call forwarding. Call forwarding is a local area switching service that allows an in-coming call to be routed to another location. Many central offices and private branch exchanges feature various call forwarding services. Another well-known and popular local area switching service is caller identification (caller ID). Caller ID is a service where information of a calling party is sent to the terminating number. In the public switched telephone network, caller ID information is sent to the terminating, or called, party between the first and second ring signals of an incoming call.

When a subscriber has both call-forwarding and caller ID enabled, the calling number of the originating, or calling, device is forwarded with call setup data and communicated to the forward-to telephone device. Accordingly, the subscriber receiving a forwarded call receives the caller ID information of the calling party at the forward-to telephone device where the call is directed.

Often times, a subscriber will have incoming calls that are directed to multiple phone numbers forwarded to another location. For instance, a subscriber may have incoming calls to his home phone and his work phone forwarded to his cell phone. If caller ID is enabled, the subscriber will receive the caller ID information of the originating device at the subscriber's cell phone when calls are forwarded from either the home or office number. In such a situation, it is often desirable to know to which telephone device a forwarded call was originally directed. For example, when receiving a forwarded call, the subscriber may want to accept any call being forwarded from the work phone but may only want to accept calls forwarded from the home phone from callers whose caller ID information the subscriber recognizes. In current implementations of call forwarding, the subscriber is unable to discern any information regarding the originally called number. Thus, for example, when an incoming call is directed to the forward-to number and the subscriber does not recognize the caller ID information, the subscriber has no way of knowing if the incoming call was directed to the home phone or the office phone.

Therefore, it would be advantageous to have an improved method, apparatus, and computer instructions for supplying caller ID information of a called telephone device to a forward-to telephone device as a call forwarding service feature. It would be additionally advantageous to forward caller ID information regarding a call originating telephone device and the called telephone device to a forward-to telephone device. It would still be further advantageous to provide caller ID information of a call originating telephone device and a called telephone device to a forward-to telephone device in a manner that enables display of caller ID information of both the call originating telephone device and the called telephone device without modification of existing caller ID equipment.

SUMMARY OF THE INVENTION

The present invention provides a method, computer program product, and a signaling system for conveying caller identification information of a called party to a forward-to telephone device in a communications system. A call set up message is received at a switching system servicing a called telephone device. The call set up message is determined to be forwarded to a switching system servicing a forward-to telephone device. Caller identification information of the called telephone device is inserted into a caller identification field of the call set up message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
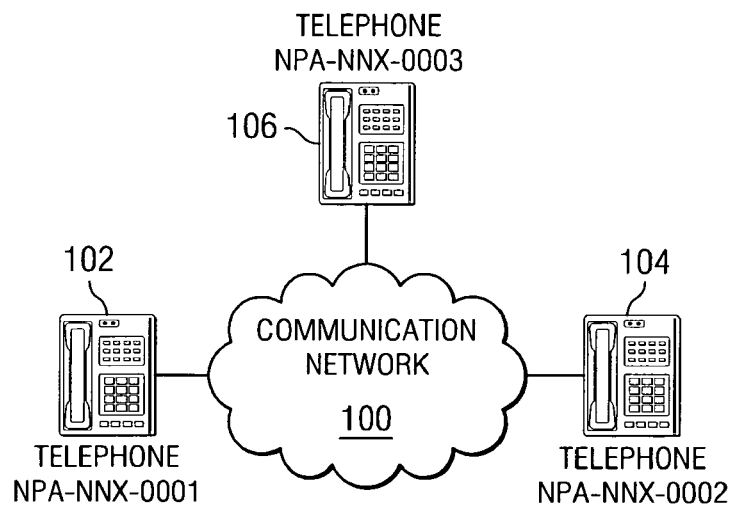
FIG. 1 is a communications network in accordance with a preferred embodiment of the present invention.

The preferred embodiment of the present invention and its advantages are best understood by referring to FIGS. 1 through 7 of the drawings, like numerals being used for like and corresponding parts of the various drawings. With reference to FIG. 1, a communications network is depicted in accordance with a preferred embodiment of the present invention. Communications network 100 is an example of a communications network in which the present invention may be implemented. Communications network 100 may include various networks, such as a public switched telephone network (PSTN), an integrated services digital network (ISDN), the Internet, or a fiber distributed data interface (FDDI) network. Communications network 100 may include copper wire, fiber optics, and wireless transmission links such as time division multiple access or code division multiple access links to provide voice and data transmissions.

Within communications network 100, caller ID information may be sent using signaling system #7 (SS7), which is a protocol used to handle setup, termination, supervisory data, and other data regarding a voice call. Caller ID (CID) information is data containing calling party information, such a calling party's telephone number and a subscriber name of the subscription associated with the calling party number. Additionally, SS7 enables other telephone service features such as call screening and call forwarding. Call forwarding is a service feature that redirects calls directed to a phone number to another device having a different phone number.

In the illustrative examples, various telephone devices are connected to communications network 100. For purposes of discussion, assume a user of call originating telephone device 102 initiates a call to called telephone device 104, which has a call-forwarding service feature enabled. Additionally, a subscriber profile associated with called telephone device 104 specifies that all calls directed to called telephone device 104 are to be forwarded to forward-to telephone device 106. In the illustrative example, call originating device 102 has a telephone number NPA-NXX-0001, called telephone device 104 has a telephone number NPA-NXX-0002, and forward-to telephone device 106 has a telephone number NPA-NXX-0003. In this example, NPA is a three digit numbering plan area, or area code, and NXX is a three digit central office identifier.

An initial address message (IAM), used for call setup between call originating telephone device 102 and forward-to telephone device 106, is conveyed through communications network 100 by way of a SS7 network infrastructure. The IAM message includes calling party CID information that is displayed by forward-to telephone device 106 when the call setup is completed and a ring signal is sent to forward-to telephone device 106. Thus, a user of forward-to telephone device 106 receives a visual display of CID information associated with call originating telephone device 102. However, no CID information is provided to forward-to telephone device 106 that identifies called telephone device 104 in conventional signaling arrangements. The present invention provides a technique for providing CID information to forward-to telephone device 106 associated with called telephone device 104 as well as call originating telephone device 102.

Figure 2:
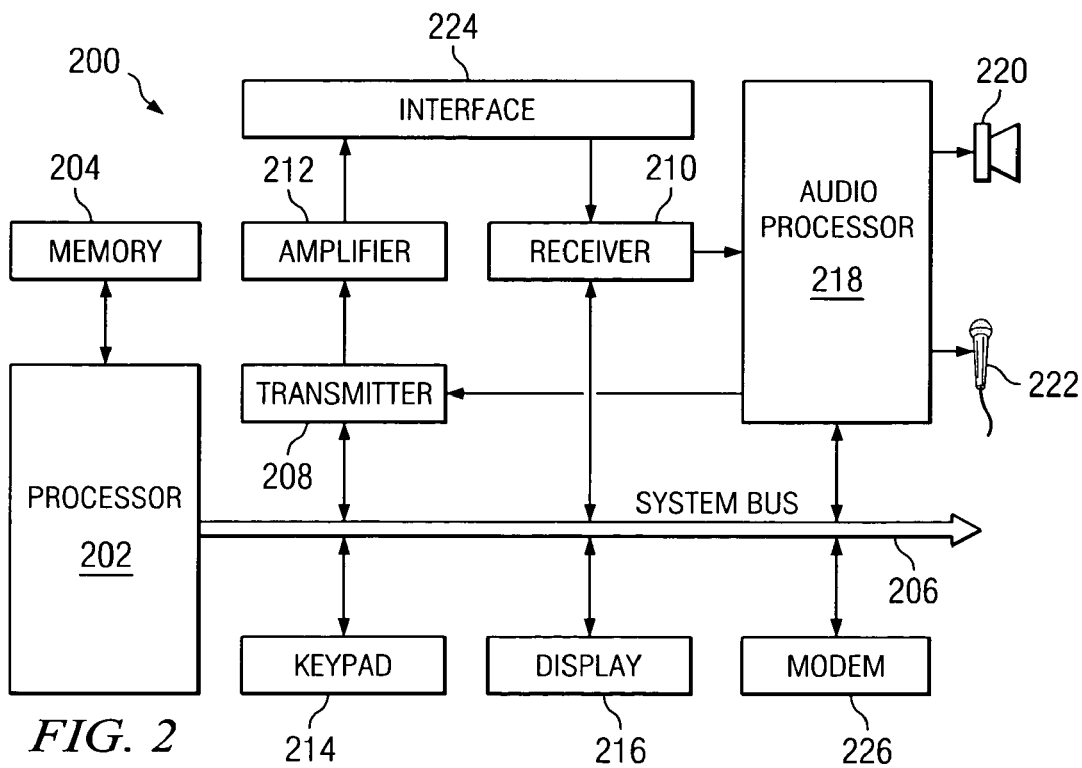
FIG. 2 is a block diagram of a communications device to which caller identification information may be transmitted according to a preferred embodiment of the present invention.

FIG. 2 is a block diagram of a communications device, such as forward-to telephone device 106 in FIG. 1, to which caller identification information may be transmitted according to a preferred embodiment of the present invention. Communication device 200 is a telephone that includes processor 202 and memory 204 and may take the form of a land line telephone, a wireless mobile phone, or another communication device suitably adapted for interfacing with the PSTN or a wireless telecommunication system. Processor 202 functions to control operation of communication device 200 and may be a general-purpose microprocessor operating under the control of instructions stored in a memory, such as memory 204, or device-specific circuitry for controlling the operation of the telephone device.

Processor 202 is connected by system bus 206 to transmitter 208, receiver 210, keypad 214, display 216, and audio processor 218. Keypad 214 is the user interface for non verbal input in these illustrative examples and may be a numeric keypad and may include other function buttons or alpha character buttons. Keypad 214 generates signals, in these examples, which are dual tone multi frequency (DTMF) signals used by touchtone telephones.

Display 216 in communication device 200 may be any type of display device including a liquid crystal display (LCD) or other known displays, such as a cathode ray tube or active matrix display. Modem 226 is adapted to demodulate frequency shift keying (FSK) modulated data. Processor 202 supplies demodulated FSK data including CID information for driving display 216.

Transmitter 208 and receiver 210 are coupled to a telephone signal by interface 224 to provide full duplex communication. The telephone signal may be provided by a telephone line in a land-based telephone or an antenna, for a wireless telephone. Audio processing circuit 218 provides basic analog audio outputs to speaker 220 and accepts analog audio inputs from microphone 222. Received signals are demodulated and decoded by receiver 210. Transmitter 208 encodes and modulates signals passed to it by processor 202 or audio processor 218. The output of the transmitter is amplified by power amplifier 212 to control the power level at which the signal is transmitted. Those of ordinary skill in the art will appreciate that the hardware depicted in FIG. 2 may vary.

Figure 3:
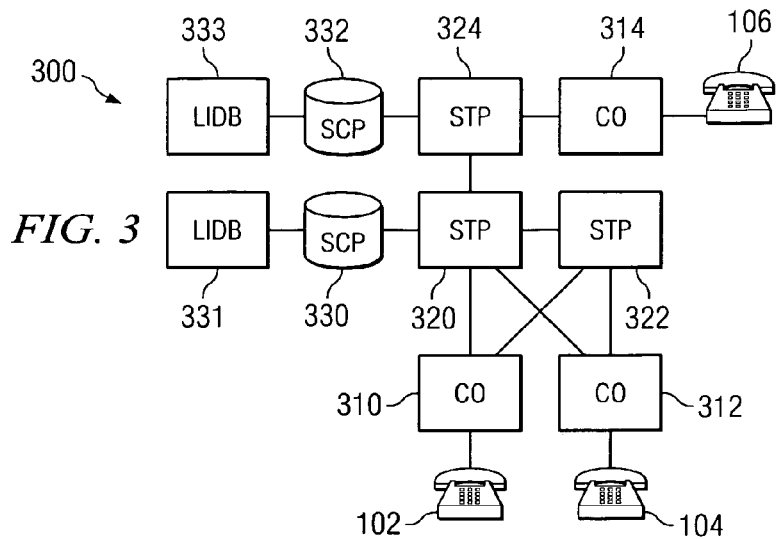
FIG. 3 is a block diagram of a telecommunication signaling system in which a preferred embodiment of the invention may be implemented.

FIG. 3 is a block diagram of a telecommunication signaling system 300, such as an SS7 network, in which a preferred embodiment of the invention may be implemented. Call originating telephone device 102, called telephone device 104, and forward-to telephone device 106, are connected with respective central offices (COs) 310, 312, and 314, also referred to as public exchanges. Telecommunication signaling system 300 also includes signaling transfer points (STPs) 320, 322, and 324. Each of STPs 320 and 324 are connected with respective service control points (SCPs) 330 and 332. SCPs 330 and 332 provide a front end to respective database systems, such as line information databases (LIDBs) 331 and 333.

COs 310, 312 and 314 are carrier facilities where subscriber lines are joined and provide switching functions for connected telephone devices. In the illustrative telecommunication signaling system 300, CO 310 provides originating and terminating switching services to call originating telephone device 102, CO 312 provides originating and terminating switching functions for called telephone device 104, and CO 314 provides originating and terminating switching functions for forward-to telephone device 106. COs 310, 312 and 314 may be implemented as, for example, 1AESS or 5ESS switches manufactured by Lucent Technologies, Inc., DMS-100 switches manufactured by Nortel Networks Corporation, or the like.

STPs 320 and 322 are packet switches for enabling common channel interoffice signaling, namely the signaling system #7. STPs 320 and 322 facilitate set up and tear down of phone calls, out of band call information signaling, and relay of information between COs and SCPs. STPs 320, 322, and 324 may be implemented as, for example, a BroadBand STP manufactured by the Nortel Networks Corporation.

SCPs 330 and 332 are implemented as computers that interface with database systems. For example, LIDBs 331 and 333 store subscription profiles of telephone devices local to the particular SCP. SCPs 330 and 332 also interface with databases that provide translation and routing data required for delivering advanced network services.

Figure 4:
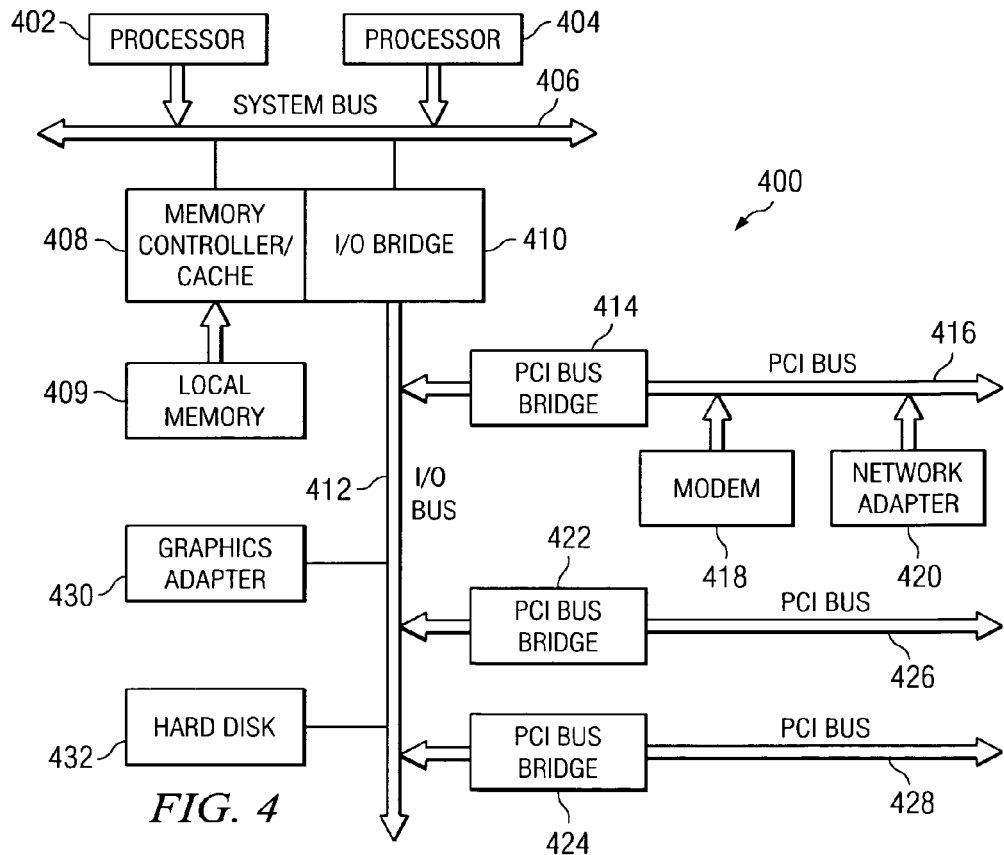
FIG. 4 is a block diagram of a data processing system that may be implemented as a central office in accordance with a preferred embodiment of the present invention.

Referring to FIG. 4, a block diagram of data processing system 400 that may be implemented as a central office, such as CO 312 in FIG. 3, is depicted in accordance with a preferred embodiment of the present invention. To simplify the discussion, only the components of data processing system 400 for performing network signaling are shown. It is understood that implementation of CO 312 includes voice switching hardware and software as well as other functional entities not shown. Thus, the description of data processing system 400 is representative of, for example, an SS7 adjunct that may be collocated with a voice switching CO or may be representative of a portion of a CO adapted to perform circuit switching functions and network signaling functions. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of network adapters such as modems, 10/100 baseT Ethernet interface cards, and T1 interface cards, may be connected to PCI local bus 416. Typical PCI bus implementations will support four PCI expansion slots or add-in connectors.

Additional PCI bus bridges 422 and 424 provide interfaces for additional PCI local buses 426 and 428, from which additional modems or network adapters may be supported. In this manner, data processing system 400 allows connections to multiple computers, routers or other devices in communications system 100. A memory-mapped graphics adapter 430 and hard disk 432 may also be connected to I/O bus 412 as depicted, either directly or indirectly. Data processing system 400 includes software executed by processor 402 for modifying a call setup message, such as an initial address message, for enabling delivery of CID information regarding called telephone device 104 to be displayed on a conventional caller ID-enabled telephone or peripheral device.

Those of ordinary skill in the art will appreciate that the hardware depicted in FIG. 4 may vary. The depicted example is not meant to imply architectural limitations with respect to the present invention.

Figure 5:
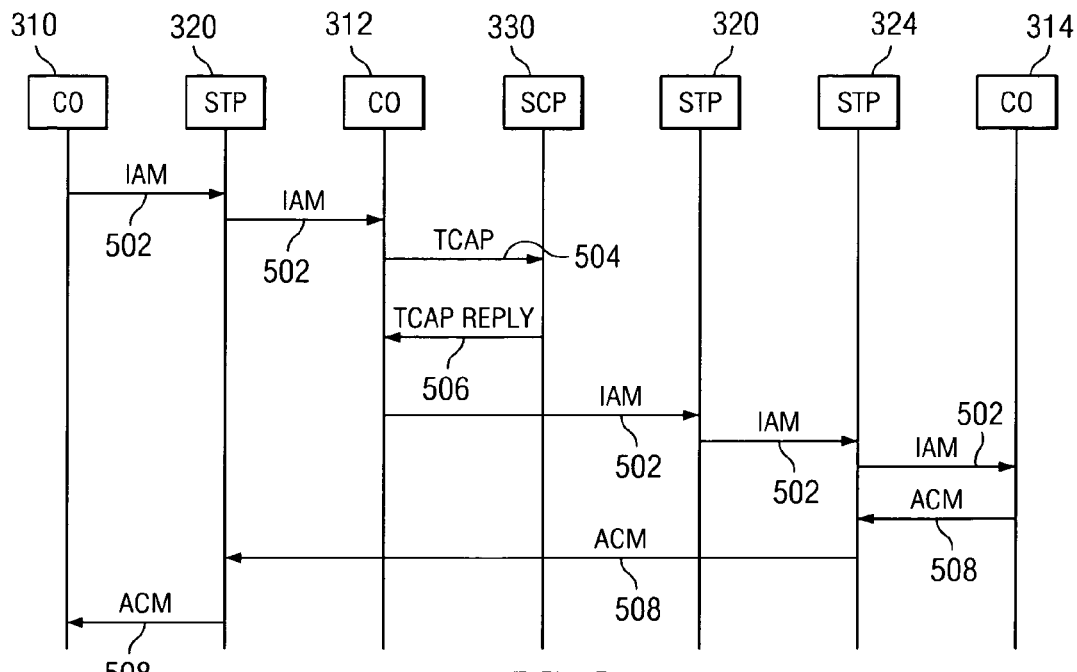
FIG. 5 is a message flow diagram illustrating call set up signaling when a call originating telephone device places a call to a called telephone device in accordance with a preferred embodiment of the present invention.

FIG. 5 is a message flow diagram 500 illustrating call set up signaling when call originating telephone device 102 places a call to called telephone device 104. IAM 502 is transmitted from CO 310 to STP 320. IAM 502 includes various information such as an originating point code, a destination point code, and phone numbers of call originating telephone device 102 and called telephone device 104. Additionally, IAM 502 may include the name of the person to whom the subscription of call originating telephone device 102 is registered. The destination point code is a numeric address that identifies CO 312 as the destination CO that services called telephone device 104 assigned the telephone number dialed at call originating telephone device 102.

Alternatively, the destination point code may provide an address of a signaling point used to route IAM 502 to CO 312. STP 320 forwards IAM 502 to CO 312. CO 312 examines IAM 502 and determines the dialed number. CO 312 then interrogates a subscription profile assigned to the called number by, for example, transmitting a transaction capabilities application part (TCAP) message 504 to SCP 330 that services called telephone device 104. SCP 330 provides a front end to various databases, including LIDB 331.

LIDB 331 includes information regarding subscription services, such as call screening and call forwarding information. For purposes of discussion, assume called telephone device 104 has a subscription record in LIDB 331 that provides an indication that call forwarding is enabled for called telephone device 104. Further assume called telephone device 104 has elected to have all calls forwarded to forward-to telephone device 106 and that an indication thereof is included in the subscription record of LIDB 331. SCP 330 forwards the subscriber information extracted from LIDB 331 including the forward-to number to CO 312 by, for example, TCAP reply message 506. CO 312 then inserts a destination point code of CO 314, or alternatively a destination point code of a signaling point used for routing IAM 502 to CO 314, into IAM 502.

In accordance with a preferred embodiment of the invention, CO 312 inserts the telephone number of called telephone device 104 into a field of IAM 502 such that display of the called telephone number is enabled on conventional caller ID decoding equipment. Preferably, CO 312 inserts the called party number into a calling party name field of IAM 502. CO 312 then forwards IAM 502 to CO 314 that provides switching services to forward-to telephone device 106 assigned the forward-to number specified by the subscriber record in LIDB 331.

In the illustrative example, IAM 502 is forwarded to CO 314 via STPs 320 and 324. CO 314 examines IAM 502 and determines that it services the forward-to number. CO 314 then rings forward-to telephone device 106 and transmits address complete message (ACM) 508 to CO 310 servicing call originating telephone device 102. ACM 508 indicates the remote end of the trunk circuit has been reserved and is communicated to CO 310 via STPs 320 and 324. The ring signal sent to forward-to telephone device 106 includes caller identification information. CO 310 then rings call originating telephone device 102 and completes the voice circuit between originating device 102 and forward-to telephone device 106.

Forward-to telephone device 106 receives the ring signal from CO 314. The caller ID information is extracted from the ring signal and displayed on device 106 suitably equipped with caller ID capabilities. Alternatively, the caller ID information may be displayed on a caller ID peripheral device connected with the phone line of forward-to telephone device 106. Caller ID information is transmitted to forward-to device 106 as, for example, FSK modem tones. The FSK-transmitted caller ID information may be sent as American Standard Code for Information Interchange (ASCII) formatted character codes.

Figure 6:
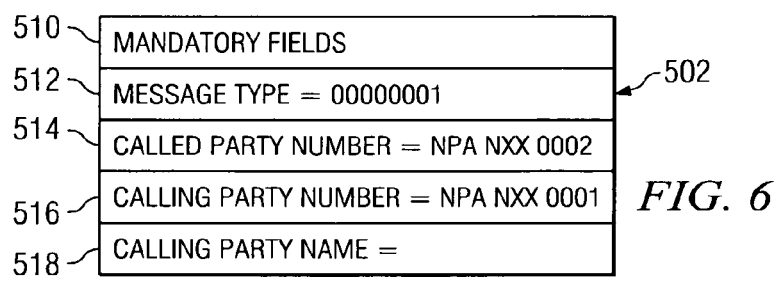
FIG. 6 is a diagrammatic illustration of an initial address message as received by a central office in accordance with a preferred embodiment of the present invention.

FIG. 6 is a diagrammatic illustration of IAM 502 as received by CO 312 in accordance with a preferred embodiment of the invention. The fields of IAM 502 shown and described are chosen only to facilitate an understanding of the invention and are not intended to provide an exhaustive description of an initial address message. Various other fields may be, and typically are, included within an initial address message.

IAM 502 is an American National Standards Institute (ANSI) Integrated Services Digital Network User Part (ISUP) message and includes a number of mandatory fields 510, such as a circuit identification code value and a routing label. Message type field 512 includes an octet having a value that identifies the message as an initial address message.

An initial address message type is typically designated with an octet having a decimal value of "1" in accordance with SS7 standards. Called party number field 514 is set to the phone number of called telephone device 104. IAM 502 includes fields for carrying calling party CID information. Calling party number field 516 includes the phone number of call originating telephone device 102 and calling party name field 518 may include the name of the person to whom the subscription of call originating telephone device 102 is registered. Calling party name field 516 is nulled in the illustrative example. The calling party number and calling party name information in respective calling party number field 516 and calling party name field 518 may be encoded as ASCII-formatted character codes.

In accordance with a preferred embodiment, CO 312 parses CID information of called telephone device 104 and inserts the CID information of called telephone device 104 into IAM 502 in response to determining that the call is to be forwarded to forward-to telephone device 106.

Figure 7:
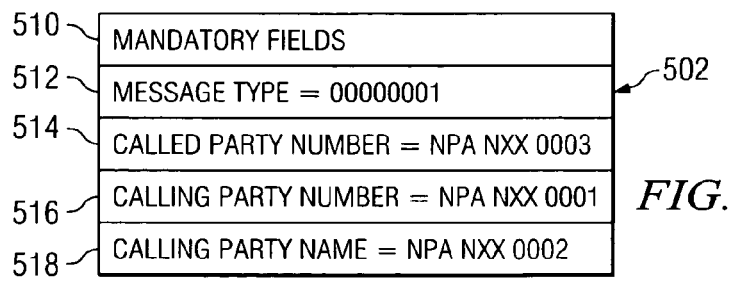
FIG. 7 is a diagrammatic illustration of the initial address message described with reference to FIG. 6 after processing by the receiving central office in accordance with a preferred embodiment of the present invention.

FIG. 7 is a diagrammatic illustration of IAM 502 after processing by CO 312 in accordance with a preferred embodiment of the present invention. The telephone number of forward-to telephone device 106 may be inserted into called party field 514 during call forwarding processing performed by CO 312. Calling party number field 516 retains the phone number of call originating telephone device 102 in the illustrative example. CID information of called telephone device 104 is inserted into calling party name field 518. In the illustrative example, the phone number of called telephone device 104 is inserted into calling party name field 518. Alternatively, the name of the person to whom the subscription of called telephone device 104 is registered may be inserted into calling party name field 518.

Thus, forward-to telephone device 106, or a caller ID peripheral device, equipped with caller ID capabilities will display the telephone number of calling party number field 516 and the telephone number of called telephone device 104 in calling party name field 518. Advantageously, a user receiving a phone call at forward-to telephone device 106 is provided caller ID information regarding the calling party as well as caller ID information of the called telephone device 104.

As described, the present invention provides a methodology and computer program product for enabling the delivery of caller identification information regarding a called telephone device to a forward-to telephone device. A user having calls forwarded from multiple telephone devices to a single telephone device is able to ascertain to which of the multiple telephone devices a forwarded call was originally directed. The present invention may be implemented in a communication system with no hardware modification either to the signaling network or end user equipment. Preferably, the call-forwarding process described herein is implemented as a subscription service. A subscriber record may be modified to include the described call forwarding service option. Central offices may be adapted to perform insertion of CID information into a signaling message by a software modification.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for conveying caller identification information of a called party to a forward-to telephone device in a communications system, the method comprising:

receiving a call set up message at a first switching system servicing a called telephone device;

determining whether the call set up message is to be routed to a second switching system servicing a forward-to telephone device; and responsive to determining the call is to be routed to a second switching system servicing the forward-to telephone device, inserting caller identification information of the called telephone device into a caller identification field of the call set up message.

2. The method of claim 1, wherein the inserting step includes:

inserting a telephone number of the called telephone device into a calling party name field of the call set up message.

3. The method of claim 1, wherein the inserting step includes:

inserting a subscriber name of the called telephone device into a calling party name field of the call set up message.

4. The method of claim 1, wherein the call set up message is an initial address message.

5. The method of claim 1, further including:

responsive to inserting the caller identification information into the caller identification field, communicating the call set up message to the second switching system.

6. The method of claim 5, further including:

responsive to receiving the call set up message by the second switching system, transmitting the caller identification information to the called telephone device.

7. The method of claim 1, wherein the determining step includes:

interrogating a subscription record assigned to the called telephone device.

8. A signaling system for performing call set up processing in a communication system, the signaling system comprising:

a line information database having subscriber records indicating telephone service subscription features;

a first switching system servicing a called telephone device identified in a call set up message, wherein the switching system, responsive to interrogating the line information database, determines the call set up message is to be forwarded and inserts caller identification information of the called telephone device into a caller identification field of the call set up message; and a second switching system for receiving the call set up message, wherein the second switching system transmits the caller identification information to a forward-to telephone device.

9. The signaling system of claim 8, wherein the caller identification field is a calling party name field.

10. The signaling system of claim 8, wherein the caller identification information of the called telephone device is a telephone number of the called telephone device.

11. The signaling system of claim 8, wherein the caller identification information of the called telephone device is a name of a person with which the called telephone device is registered.

12. The signaling system of claim 8, wherein the call set up message is an initial address message.

13. The signaling system of claim 8, wherein the line information database contains a subscriber record identifying a phone number of the forward-to telephone device and indicating that the caller identification information of the called telephone device is to be forwarded to the forward-to telephone device.

14. A computer program product in a computer readable medium for modifying a call set up message, the computer program product comprising:

first instructions, responsive to reading a telephone number of a called telephone device in a call set up message, for interrogating a subscriber record database and determining the call set up message is to be terminated by a forward-to telephone device, wherein the first instructions insert caller identification information of the called telephone device into a first caller identification field of the call set up message; and second instructions for transmitting the call set up message to a switching system servicing the forward-to telephone device.

15. The computer program product of claim 14, wherein the first caller identification field is a calling party name field of the call set up message.

16. The computer program product of claim 14, wherein the caller identification information is a telephone number of the called telephone device.

17. The computer program product of claim 14, wherein the caller identification information is a name of a person to which the called telephone device is registered.

18. The computer program product of claim 14, wherein the call set up message is an initial address message.

19. The computer program product of claim 14, wherein caller identification information of the calling party is included in a second caller identification field of the call set up message.

20. A method in a data processing system for providing caller identification information, the method comprising:

detecting a call originating from a calling number to a called number;

determining whether the call to the called number is to be forwarded to another number;

responsive to determining that the call to the called number is to be forwarded to the another number, including caller identification information of the called number in a call set up message; and routing the call set up message to the another number.

21. The method of claim 20, wherein the including step includes:

including caller identification information of the calling number in the call set up message.

* * * * *